(12) United States Patent
Smith et al.

(10) Patent No.: US 6,931,575 B2
(45) Date of Patent: Aug. 16, 2005

(54) METHOD AND SYSTEM FOR TESTING HARDWARE AND SOFTWARE CONFIGURATIONS IN A COMPUTER SYSTEM

(75) Inventors: T. Gavin Smith, Austin, TX (US); Terry Wayne Liles, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 605 days.

(21) Appl. No.: 09/916,782

(22) Filed: Jul. 27, 2001

(65) Prior Publication Data

US 2003/0023900 A1 Jan. 30, 2003

(51) Int. Cl.[7] ................................................ G06F 11/00
(52) U.S. Cl. ........................................................ 714/44
(58) Field of Search ............................................ 714/44

(56) References Cited

U.S. PATENT DOCUMENTS

| | | | | |
|---|---|---|---|---|
| 4,837,764 A | * | 6/1989 | Russello ...................... | 714/46 |
| 4,964,124 A | * | 10/1990 | Burnett ........................ | 714/44 |
| 5,247,683 A | | 9/1993 | Holmes et al. ............. | 709/221 |
| 5,410,681 A | * | 4/1995 | Jessen et al. ................. | 703/27 |
| 5,421,009 A | | 5/1995 | Platt ............................ | 709/221 |
| 5,495,584 A | * | 2/1996 | Holman et al. ............. | 710/316 |
| 5,504,689 A | * | 4/1996 | Fiebrich et al. ............. | 702/122 |
| 5,748,575 A | | 5/1998 | Lee .......................... | 369/30.88 |
| 5,794,052 A | | 8/1998 | Harding ...................... | 717/178 |
| 5,802,297 A | | 9/1998 | Engquist ..................... | 709/212 |
| 5,805,897 A | | 9/1998 | Glowny ...................... | 717/178 |
| 5,835,777 A | | 11/1998 | Staelin ........................ | 717/175 |
| 5,842,024 A | | 11/1998 | Choye et al. ............... | 717/178 |
| 5,894,571 A | | 4/1999 | O'Connor ...................... | 713/2 |
| 5,995,757 A | | 11/1999 | Amberg et al. ............. | 717/175 |
| 6,178,527 B1 | * | 1/2001 | Vidales ........................ | 714/44 |
| 6,182,275 B1 | | 1/2001 | Beelitz et al. .............. | 717/175 |
| 6,236,901 B1 | | 5/2001 | Goss ............................ | 700/95 |
| 6,389,560 B1 | * | 5/2002 | Chew ........................... | 714/43 |
| 6,442,712 B1 | * | 8/2002 | Jeon ............................. | 714/43 |
| 6,543,047 B1 | * | 4/2003 | Vrhel et al. ................. | 717/121 |
| 6,751,569 B2 | * | 6/2004 | Merkin et al. .............. | 702/120 |

\* cited by examiner

Primary Examiner—Robert Beausoliel
Assistant Examiner—Michael Maskulinski
(74) Attorney, Agent, or Firm—Haynes and Boone, LLP

(57) ABSTRACT

A method that includes setting a plurality of switching devices to cause a first plurality of devices to be coupled to a computer system is provided. The method also includes booting the computer system and detecting one or more errors associated with one or more of the first plurality of devices.

19 Claims, 3 Drawing Sheets

METHOD AND SYSTEM FOR TESTING HARDWARE AND SOFTWARE CONFIGURATIONS IN A COMPUTER SYSTEM

This application relates to co-pending U.S. patent application Ser. No. 09/315,653, filed on May 20, 1999, entitled "Method and Apparatus for Windows-Based Installation for Installing Software on Build-to-Order Computer Systems", naming Bobby G. Doran, Jr., Bill Hyden, and Terry Wayne Liles as inventors.

This application relates to co-pending U.S. patent application Ser. No. 09/333,786, filed on Jun. 15, 1999, entitled "Method and Apparatus for Testing Custom-Configured Software/Hardware Integration in a Computer Build-to-Order Manufacturing Process", naming Thomas Vrhel Jr., Gaston M. Barajas, Paul J. Maia, and W. D. Todd Nix as inventors.

The co-pending applications are incorporated by reference in their entirety, and are assigned to the assignee of this application.

BACKGROUND

The disclosures herein relate generally to computer systems and more particularly to a method and system for testing hardware and software configurations in computer system.

Computer systems have numerous connections by which hardware devices can be added. These connections include expansion slots, input/output (I/O) ports, and drive connections. A computer manufacturer or vendor, such as a build-to-order computer manufacturer, may offer its customers a choice from any number of different devices for each connection in a computer system, resulting in a large number of possible hardware combinations. In order to minimize time and costs during software and hardware validation of a computer system, only a small subset of these valid hardware combinations can actually be tested. As a result, many problems or other issues relating various hardware and software configurations arise in the factory.

It would be desirable to be able to test a large number of hardware and software configurations of a computer system without incurring substantial cost or increasing test durations. Accordingly, what is needed is a method and system for testing hardware and software configurations in a computer system.

SUMMARY

One embodiment, accordingly, provides a method that includes setting a plurality of switching devices to cause a first plurality of devices to be coupled to a computer system. The method also includes booting the computer system and detecting one or more errors associated with one or more of the first plurality of devices.

A principal advantage of this embodiment is that various shortcomings of previous techniques are overcome. For example, a large number of hardware and software configurations of a computer system may be tested without the need to assemble each configuration individually.

DETAILED DESCRIPTION

Figure 1:
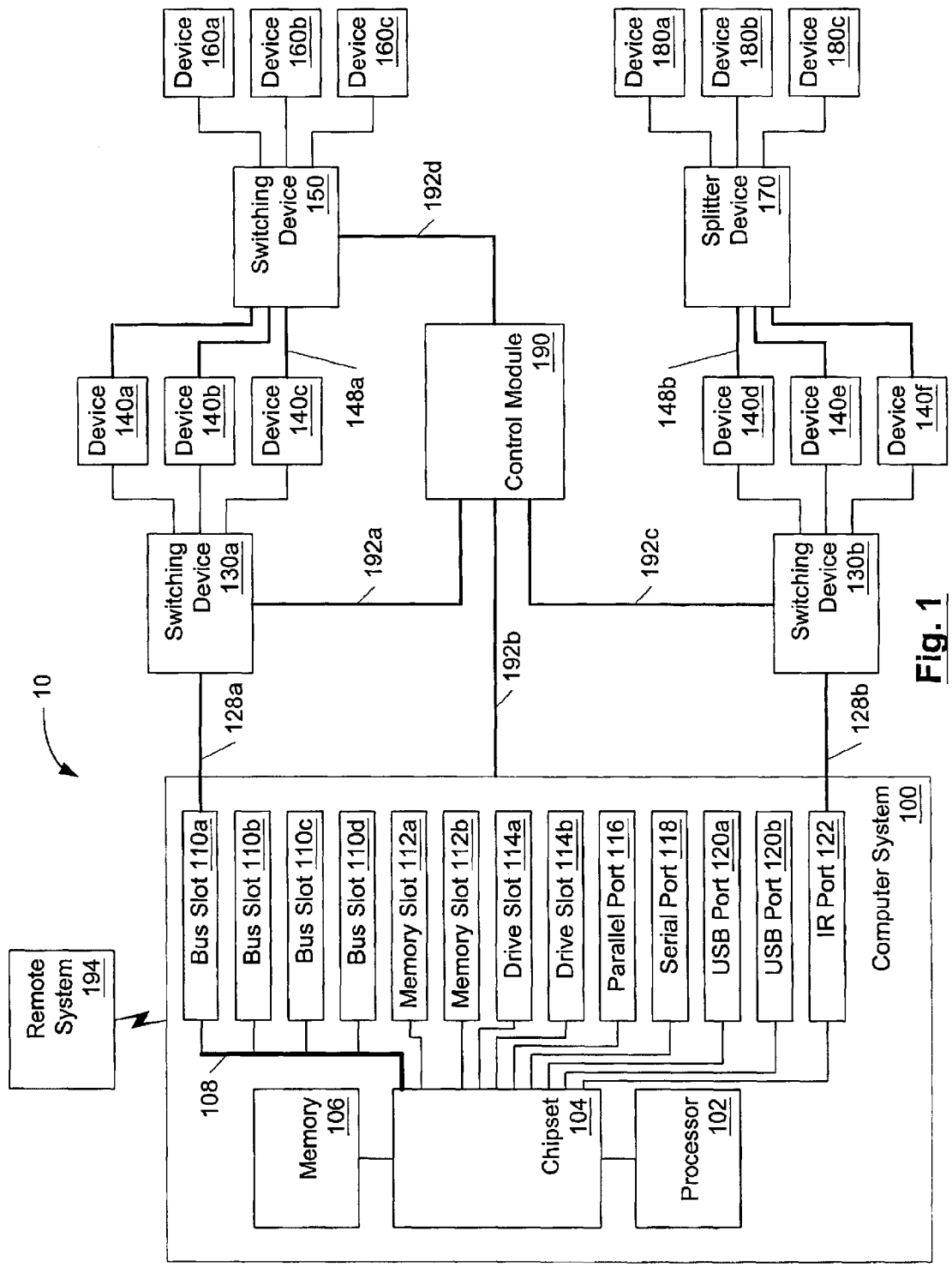
FIG. 1 is a diagram illustrating an embodiment of a system for testing hardware and software configurations in a computer system.

FIG. 1 is a diagram illustrating an embodiment of a system 10 for testing hardware and software configurations in a computer system. In FIG. 1, a computer system 100 is coupled to a plurality of switching devices 130a and 130b and a remote system 194. Switching devices 130a and 130b are each coupled to a plurality of devices 140a, 140b, and 140c, and 140d, 140e, and 140f, respectively. Devices 140a, 140b, and 140c are coupled to a switching device 150. Switching device 150 is coupled to a plurality of devices 160a, 160b, and 160c. Devices 140d, 140e, and 140f are coupled to a splitter device 170. Splitter device 170 is coupled to a plurality of devices 180a, 180b, and 180c.

System 10 is configured to allow various hardware and software configurations to be tested on computer system 100. Computer system 100 includes a processor 102, a chipset 104, and a non-volatile memory 106 such as a CMOS. Non-volatile memory 106 includes a basic input output system (BIOS) (not shown) or a system firmware (not shown) configured to cause computer system 100 to boot or reboot in response to being powered up or reset. Computer system 100 also includes numerous connections that allow hardware devices to operate in conjunction with computer system 100. These connections include bus slots 110a, 110b, 110c, and 110d, memory slots 112a and 112b, drive slots 114a and 114b, parallel port 116, serial port 118, Universal Serial Bus (USB) ports 120a and 120b, and infrared (IR) port 122. Bus slots 110a, 110b, 110c, and 110d connect to a bus 108 of computer system 100 such as a Peripheral Component Interconnect (PCI) bus and are configured to couple to devices configured to operate using the bus such as video adapters and audio adapters. Memory slots 112a and 112b are configured to couple to memory devices such as RAM and SDRAM. Drive slots 114a and 114b are configured to couple to hard disk drives, various CD drives, and other storage devices. Parallel port 116, serial port 118, and Universal Serial Bus (USB) ports 120a and 120b are configured to couple to any suitable peripheral devices. IR port 122 is configured to couple to a device configured to wirelessly communicate with computer system 100. Computer system 100 may also include other connections not shown in FIG. 1 such as bus expansion slots, wireless or other types of input/output (I/O) ports, PCMCIA (i.e. PC Card) slots, or other interfaces.

A manufacturer or vendor of computer system 100 may include any number of devices in computer system 100 prior to providing computer system 100 to a customer. The manufacturer may assemble computer system 100 according to a build-to-order manufacturing process where the manufacturer assembles hardware and software components of computer system 100 according to the specifications of a customer. Based on the number of different devices that may be connected to different connections in computer system 100, computer system 100 may be offered in a large number of hardware configurations by a manufacturer or vendor of computer system 100. In addition, a large number of software configurations may be offered for each of the hardware configurations as a customer may specify one of a set of operating systems and one or more of a set of applications to be included in computer system 100.

In order to test various hardware and software configurations of computer system 100, one or more connections of computer system 100 is coupled to a switching device, such as switching device 130a coupled to bus slot 110a as indicated by reference numeral 128a and switching device 130b coupled to IR port 122 as indicated by reference numeral 128b. Each switching device is coupled to a plurality of devices that may be coupled to the connection of computer system 100. For example, switching device 130a is coupled to devices 140a, 140b, and 140c, and switching device 130b is coupled to devices 140d, 140e, and 140f. Switching device 130a is configured to selectively cause one of devices 140a, 140b, or 140c to be coupled to computer system 100 at a time in response to a signal 192a from control module 190. Similarly, switching device 130b is configured to selectively cause one of devices 140d, 140e, or 140f to be coupled to computer system 100 at a time in response to a signal 192c from control module 190. The functions and operation of control module 190 will be described in additional detail below.

Switching devices 130a and 130b may be any type of device configured to selectively enable one of a plurality of devices to be coupled to computer system 100 at a given time. An example of such devices includes a conventional switch. Switching devices 130a and 130b are shown by way of example in FIG. 1. In other embodiments, switching devices may be coupled to any number of connections of computer system 100.

A device configured to operate in conjunction with computer system 100 may also be configured to operate numerous types or models of secondary devices. For example, a video adapter coupled to bus slot 110b may be configured to operate different monitors or other display devices coupled to the video adapter. To allow these secondary devices to be tested, a switching device or a splitter device is coupled between one or more devices and one or more secondary devices. In FIG. 1, for example, switching device 150 is coupled to devices 140a, 140b, and 140c and devices 160a, 160b, and 160c. Splitter device 170 is coupled to devices 140d, 140e, and 140f and devices 180a, 180b, and 180c. Switching device 150 is configured to selectively cause one of devices 140a, 140b, or 140c to be coupled to one of devices 160a, 160b, or 160c at a time in response to a signal 192d from control module 190. Splitter device 170 is configured to cause devices 140d, 140e, or 140f to be coupled to devices 180a, 180b, or 180c.

Switching device 150 may be any type of device configured to selectively enable one of a first plurality of devices to be coupled to one of a second plurality of devices at a given time. An example of such devices includes a conventional switch. Switching device 150 is shown by way of example in FIG. 1. In other embodiments, other switching devices may be coupled to any number of devices that are coupled to other switching devices.

Splitter device 170 may be any type of device configured to enable a first plurality of devices to be coupled to a second plurality of devices at a given time. For example, in some testing scenarios, only one device in the first plurality and one device in the second plurality are active (i.e., have power), wherein the splitter connects the active signals and ignores any signals to/from non-active devices (i.e., devices that are powered off). Accordingly, splitter device 170 can be independent of and not coupled to control module 190. Moreover, in practice, an active device coming off switching device 130b will drive the signal to the active secondary device(s) coming off the other side of splitter device 170. Alternatively, the active secondary device(s) coming off splitter device 170 will drive the signal to the active device coming off switching device 130b. An example of such splitter devices includes a conventional splitter. Splitter device 170 is shown by way of example in FIG. 1. In other embodiments, other splitter devices may be coupled to any number of devices that are coupled to other switching devices.

Although shown as coupled to multiple devices 140a, 140b, and 140c in FIG. 1, switching device 150 may be coupled to only one of devices 140a, 140b, or 140c in other embodiments. Similarly, switching device 150 may be coupled to only one of devices 160a, 160b, or 160c in other embodiments. In addition, splitter device 170 may be coupled to only one of devices 140d, 140e, or 140f in other embodiments.

Control module 190 is configured to communicate with switching devices, computer system 100, and remote system 194 in system 10. Control module 190 causes a hardware configuration and a software configuration of computer system 100 to be selected by providing inputs to switching devices, computer system 100, and/or remote system 194. In response to signal 192a from control module 190, switching device 130a selects device 140a, 140b, or 140c to couple to computer system 100. Similarly, switching device 130b selects device 140d, 140e, or 140f to couple to computer system 100 in response to signal 192c from control module 190. In addition, switching device 150 selects device 140a, 140b, or 140c to couple to device 160a, 160b, or 160c in response to signal 192d from control module 190.

The device or devices selected by control module 190 for coupling to computer system 100 or other devices comprise a hardware configuration of computer system 100. For example, control module 190 may cause device 140b and device 140f to be coupled to computer system 100 using switching devices 130a and 130b, respectively. In addition, control module 190 may cause device 160a to be coupled to device 140b using switching device 150. Splitter device 170 couples devices 180a, 180b, and 180c to devices 140d, 140e, and 140f, independently of control module 190. In this example, the set of devices 140b, 140d, 140e, 140f, 160a, 180a, 180b, and 180c comprise a hardware configuration of computer system 100. Control module 190 may also cause other devices to be included in a hardware configuration by causing other devices to be coupled to other slots in computer system 100 using other switching devices (not shown in FIG. 1).

After a hardware configuration has been selected, computer system 100 may be booted or rebooted by a BIOS or system firmware to cause each device in a hardware configuration to be detected and/or tested. The BIOS or system firmware may then transfer control of computer system 100 to an operating system (not shown). The devices may be detected by the BIOS, the system firmware, and/or the operating system executing on computer system 100. An indication of the detection and/or operation of each device may be stored into a log file on computer system 100 or remote system 194. In addition, one or more errors associated with one or more devices in the hardware configuration may be detected. An indication of each error may be stored into a log file on computer system 100 or remote system 194.

A computer is "booted" (or "rebooted") when it initiates execution of operating system software (e.g., Microsoft Windows™) in response to an event ("boot event"). Such a boot event may be, for example, a user "turning on" the computer (e.g., the user causing application of electrical power to the computer by switching an on/off button of the computer). Alternatively, such a boot event may be receipt by the computer of a command to initially execute the operating system software. For example, the computer may receive such a command from the user (e.g., through input devices of the computer system), or from a computer application executed by the computer, or from another computer (e.g., through a network that is connected to the computer). Such booting of the computer system may be referred to as a computer system boot process, or a computer system boot operation.

Computer system 100 may also cause tests to be performed on one or more devices of a hardware configuration. These tests may be specific to a device such as by sending video signals to a monitor or by sending memory operations to a storage device. The tests may be performed using common application programs or other code modules configured to cause devices to be tested. The results of these tests may be stored into a log file on computer system 100 or remote system 194.

Subsequent to computer system 100 booting, detecting devices in a hardware configuration, or performing tests on devices in a hardware configuration, control module 190 causes another test configuration to be set up. This next test configuration includes a different set of devices from the previous test configuration, although one or more devices may be the same in both configurations. After causing the next test configuration to be selected, control module 190 causes computer system 100 to be powered down or reset using a signal 192b. When computer system 100 powers down, computer system 100 may automatically power up after a predefined time period or may receive a wake-up signal in response to the completion of a configuration change. In response to being powered up or being reset, computer system 100 reboots using a BIOS or system firmware. Computer system 100 then repeats the detection functions and/or tests as described above for this hardware configuration. After computer system 100 completes any tests on this hardware configuration, control module 190 may cause additional hardware configurations to be selected and tested. Control module 190 may select hardware configurations from a list of hardware configurations to be tested. The list may be altered or changed by a manufacturer of computer system 100 to include or not include particular hardware configurations.

Control module 190 may cause different software configurations to be tested for each hardware configuration. A software configuration may comprise a BIOS or a system firmware, an operating system, and/or one or more applications and may be stored on a storage device (not shown) accessible by computer system 100. The storage device may be one of a plurality of storage devices coupled to a switching device (not shown) that is connected to drive slot 114a or 114b. Each of this plurality of storage devices may include a different software configuration allowing control module 190 to select a software configuration by causing a storage device that includes the software configuration to be coupled to computer system 100. Alternatively, control module 190 may cause a software image or a set of software components from remote system 194 to be stored onto a storage device coupled to computer system 100. Control module 190 may select software configurations from a list of software configurations to be tested. The list may be altered or changed by a manufacturer of computer system 100 to include or not include particular software configurations.

Control module 190 may include any combination of hardware or software components. For example, control module 190 may be a set of manual switches that are set by a technician and may include buttons or other devices configured to cause computer system 100 to be powered up and down and/or reset. Control module 190 may also be a program that is executable by computer system 100 from a memory in computer system 100. In addition, control module 190 may be a program that is executable by computer system 100 from a memory located on remote system 194. Further, control module 190 may be a program that is executable by remote system 194. Remote system 194 may control the operation of computer system 100, the switching devices, and the splitter devices using a communications network such as the Internet, an intranet, a local area network, a wide area network, a wireless network, or a point-to-point connection. Still further, control module 190 may include a combination of hardware and software components.

In embodiments where control module 190 comprises a computer program product, control module 190 may be stored in an apparatus that is accessible by computer system 100. Such an apparatus may be a hard disk drive, a CD-ROM, a floppy disk, network storage device, a RAM, or any other suitable storage device.

Figure 2:
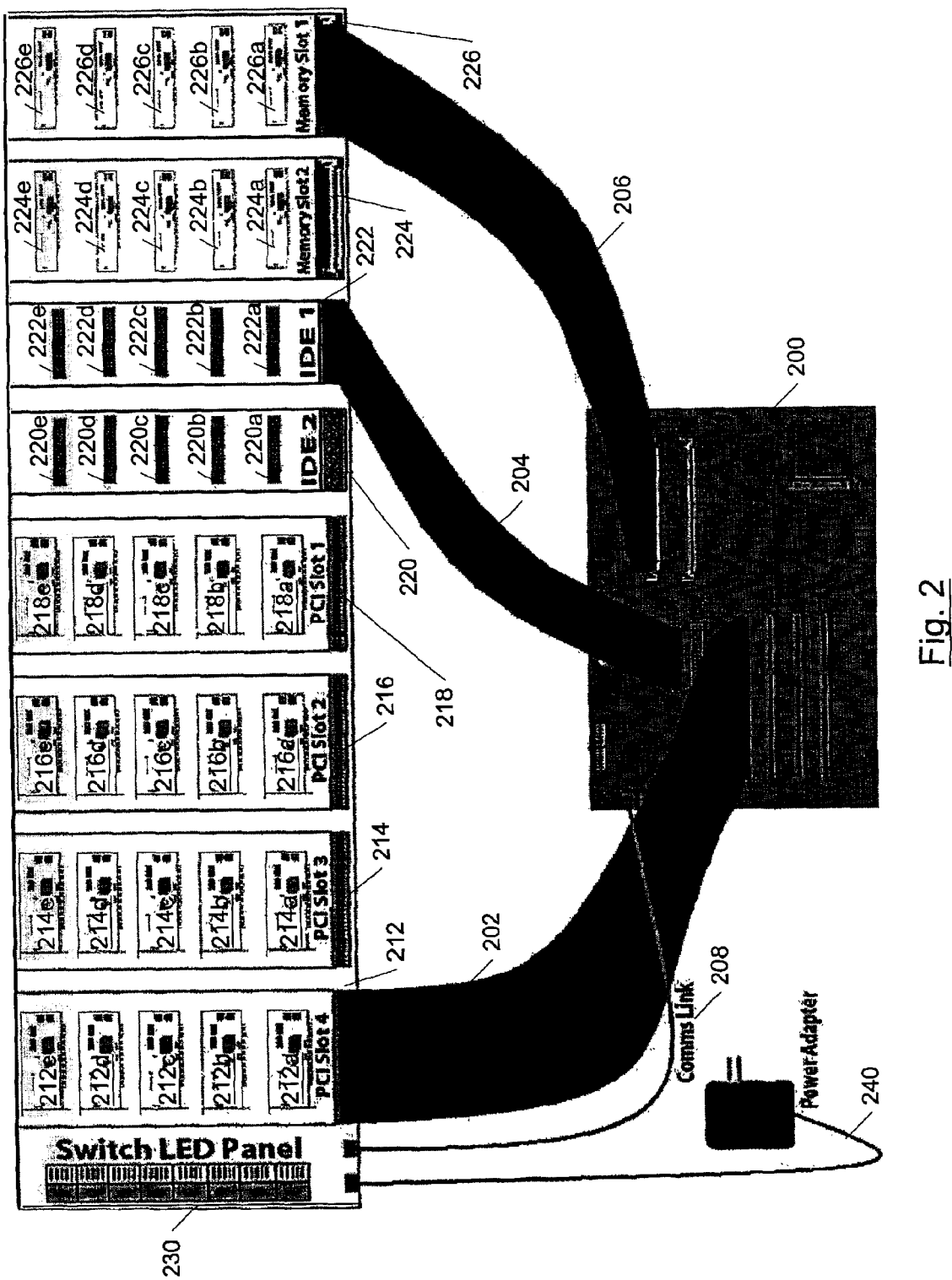
FIG. 2 is a diagram illustrating an embodiment of a system for testing hardware and software configurations in a computer system.

FIG. 2 is a diagram illustrating an embodiment of a system for testing hardware and software configurations in a computer system 200. In FIG. 2, computer system 200 couples to devices on a test rack 210. Test rack 210 includes connections 212, 214, 216, 218, 220, 222, 224, and 226. Each connection may be coupled to a corresponding connection on computer system 200 as indicated by example connectors 202, 204, and 206 coupling connections 212, 222, and 226 to computer system 200, respectively.

Each connection 212, 214, 216, 218, 220, 222, 224, and 226 is coupled to a switching device (not shown) which is coupled to a plurality of devices. Devices 212a, 212b, 212c, 212d, and 212e are coupled to a switching device coupled to connection 212. Devices 214a, 214b, 214c, 214d, and 214e are coupled to a switching device coupled to connection 214. Devices 216a, 216b, 216c, 216d, and 216e are coupled to a switching device coupled to connection 216. Devices 218a, 218b, 218c, 218d, and 218e are coupled to a switching device coupled to connection 218. Devices 220a, 220b, 220c, 220d, and 220e are coupled to a switching device coupled to connection 220. Devices 222a, 222b, 222c, 222d, and 222e are coupled to a switching device coupled to connection 222. Devices 224a, 224b, 224c, 224d, and 224e are coupled to a switching device coupled to connection 224. Devices 226a, 226b, 226c, 226d, and 226e are coupled to a switching device coupled to connection 226.

Test rack 210 includes a control panel 230. Control panel 230 includes an indicator for each device for each connection 212, 214, 216, 218, 220, 222, 224, and 226. The indicator for each device selected as part of a hardware configuration may be illuminated to allow a technician to see which devices are being tested at a given time. Control panel 230 may also include manual switch for each connection 212, 214, 216, 218, 220, 222, 224, and 226 to allow devices to be manually selected for testing.

Test rack 210 includes a communications link 208 to allow test rack 210 to communicate with computer system 200. Communications from test rack 210 to computer system 200 may include a signal to cause computer system 200 to power up, power down, or reset. Communications from computer system 200 to test rack 210 may include signals to cause test rack 210 to select hardware configurations or provide indications such as errors to a technician using control panel 230. Test rack 210 also includes a power adapter 240 to provide power to test rack 210.

Figure 3:
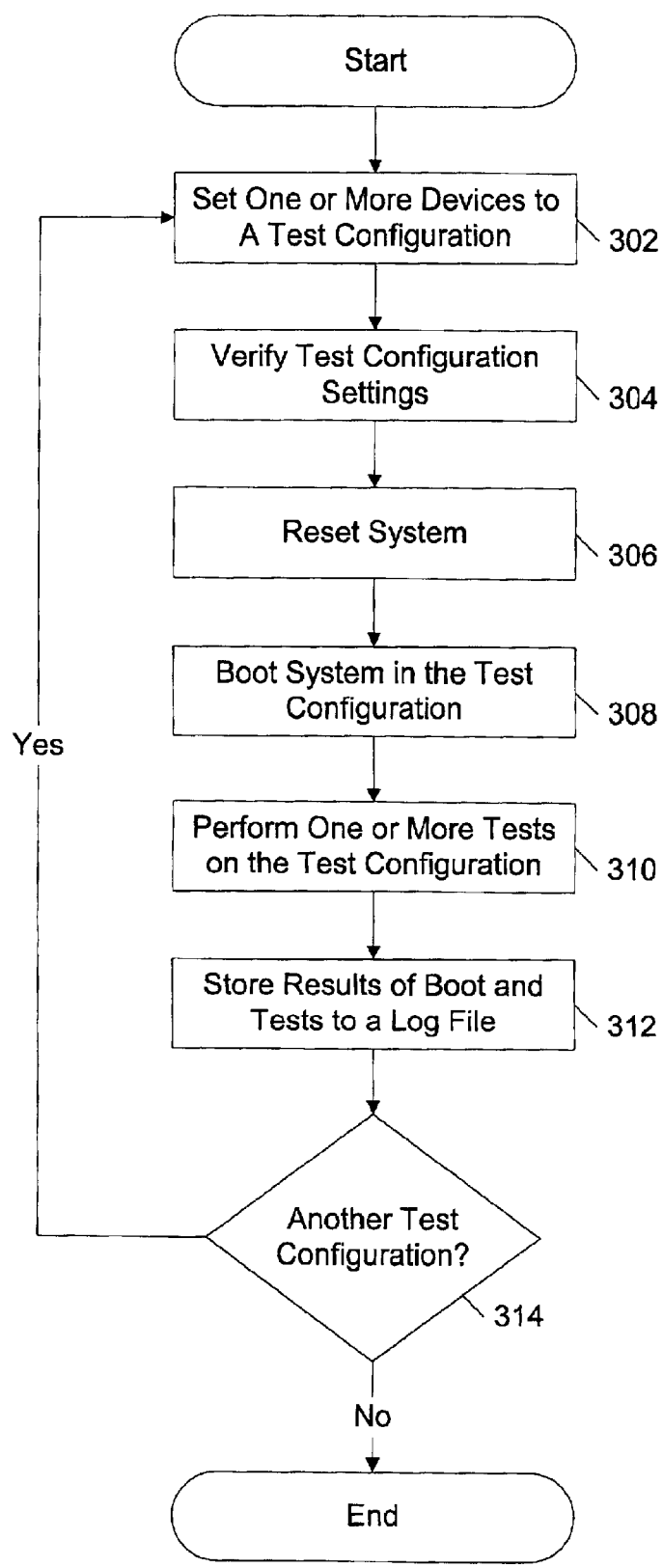
FIG. 3 is a flow chart illustrating an embodiment of a method for testing hardware and software configurations in a computer system.

FIG. 3 is a flow chart illustrating an embodiment of a method for testing hardware and software configurations in a computer system. In FIG. 3, one or more devices are set to a test configuration as indicated in step 302. The test configuration may include a specified hardware configuration and/or a specified software configuration. The test configuration settings are verified as indicated in step 304. The system is reset as indicated in step 306. The system is booted in the test configuration as indicated in step 308. One or more tests are performed on the test configuration as indicated in step 310. The results of the boot and the tests are stored to a log file as indicated in step 312. A determination is made as to whether another test configuration is desired as indicated in step 314. If another test configuration is desired, then the method continues at step 302. If another test configuration is not desired, then the method concludes as indicated.

As can be seen, the principal advantages of these embodiments are that various shortcomings of previous techniques are overcome. For example, a large number of hardware and software configurations of a computer system may be tested without the need to assemble each configuration individually.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method comprising:
providing a computer system including a first connection and a second connection, one of the connections being a wireless connection;
providing a testing system for testing hardware and software configurations in the computer system, the testing system having a first connection and a second connection;
setting a first switching device coupled to the respective first connections to cause a first one of a first plurality of devices to be coupled to a computer system;
setting a second switching device coupled to the respective second connections to cause a first one of a second plurality of devices to be coupled to the computer system;
coupling a control module to the first and second switching devices, to an additional switching device and to a third plurality of devices;
booting the computer system;
detecting the first one of the first plurality of devices using the computer system; and
detecting the first one of the second plurality of devices using the computer system.

2. The method of claim 1, further comprising:
subsequent to detecting the first one of the first plurality of devices and the first one of the second plurality of devices, setting the first switching device to cause a second one of the first plurality of devices to be coupled to the computer system.

3. The method of claim 2, further comprising:
subsequent to setting the first switching device to cause the second one of the first plurality of devices to be coupled to the computer system;
rebooting the computer system; and
detecting the second one of the first plurality of devices using the computer system.

4. The method of claim 1, further comprising:
detecting an error associated with detecting the first one of the first plurality of devices; and
storing the error into a log file on the computer system.

5. The method of claim 1, further comprising:
detecting an error associated with detecting the first one of the first plurality of devices; and
storing the error into a log file on a storage device located remotely from the computer system.

6. The method of claim 1, further comprising:
setting the additional switching device to cause one of a third plurality of devices to be coupled to the first one of the first plurality of devices.

7. The method of claim 6, further comprising:
setting a splitter device to cause a fourth plurality of devices to be coupled to the second plurality of devices.

8. The method of claim 1, further comprising:
subsequent to detecting the first one of the first plurality of devices and the first one of the second plurality of devices, performing one or more tests on the computer system using the first one of the first plurality of devices and the first one of the second plurality of devices; and
storing results associated with the one or more tests into a log file.

9. A system comprising:
a computer system that includes a first connection and a second connection, one of the connections being a wireless connection;
a testing system for testing hardware and software configurations in the computer system, the testing system having a first connection and a second connection;
a coupling interconnecting the respective first and second connections of the computer system and the testing system;
a first switching device coupled to the respective first connections;
a first plurality of devices coupled to the first switching device;
a second switching device coupled to the respective second connections;
a second plurality of devices coupled to the second switching device;
the first switching device being able to be set to cause a first one of the first plurality of devices to be coupled to the computer system;
the second switching device being able to be set to cause a first one of the second plurality of devices to be coupled to the computer system;
a control module coupled to the first and second switching devices, to an additional switching device and to a third plurality of devices; and
the computer system configured to detect the first one of the first plurality of devices and the first one of the second plurality of devices in response to a) the first switching device being set to cause the first one of the first plurality of devices to be coupled to the computer system and b) the second switching device being set to cause the first one of the second plurality of devices to be coupled to the computer system, and in response to being booted.

10. The system of claim 9, further comprising:
the control module configured to cause the first switching device to be set to cause the first one of the first plurality of devices to be coupled to the computer system, and the control module configured to cause the second switching device to be set to cause the first one of the second plurality of devices to be coupled to the computer system.

11. The system of claim 10, wherein the control module includes at least one hardware component.

12. The system of claim 10, wherein the control module includes at least one software component.

13. The system of claim 10, wherein the computer system includes the control module.

14. The system of claim 10, wherein the control module is located externally from the computer system.

15. The system of claim 10, wherein the control module is configured to cause the computer system to boot subsequent to a) causing the first switching device to be set and b) causing the second switching device to be set.

16. The system of claim 10, wherein the control module is configured to a) cause the first switching device to be set to cause a second one of the first plurality of devices to be coupled to the computer system, and wherein the control module is configured to b) cause the second switching device to be set to cause a second one of the second plurality of devices to be coupled to the computer system.

17. The system of claim 16, wherein the control module is configured to cause the computer system to be rebooted subsequent to causing the first switching device to be set to cause the second one of the first plurality of devices to be coupled to the computer system.

18. The system of claim 9, further comprising:

the additional switching device coupled to the first plurality of devices; and a third plurality of devices coupled to the additional switching device;

the additional switching device able to be set to cause one of the third plurality of devices to be coupled to the first one of the first plurality of devices.

19. The system of claim 18, further comprising:

a splitter device coupled to the second plurality of devices; and a fourth plurality of devices coupled to the splitter device;

the splitter device able to be set to cause the fourth plurality of devices to be coupled to the second plurality of devices.

* * * * *